United States Patent
Dubois et al.

(10) Patent No.: US 6,565,775 B2
(45) Date of Patent: *May 20, 2003

(54) METHOD OF COOLING AN OPTICAL FIBER WHILE IT IS BEING DRAWN

(75) Inventors: Sophie Dubois, Saint Germain en Laye (FR); Gérard Orcel, Maison Laffitte (FR); Jean-François Bourhis, Taverny (FR)

(73) Assignee: Alcatel, Paris (FR)

( * ) Notice: Subject to any disclaimer, the term of this patent is extended or adjusted under 35 U.S.C. 154(b) by 175 days.

This patent is subject to a terminal disclaimer.

(21) Appl. No.: 09/736,500

(22) Filed: Dec. 15, 2000

(65) Prior Publication Data

US 2001/0006262 A1 Jul. 5, 2001

(30) Foreign Application Priority Data

Dec. 30, 1999 (FR) .............................. 99 16723

(51) Int. Cl.⁷ ............................................. B29D 11/00
(52) U.S. Cl. .................. 264/1.24; 65/435; 264/2.6; 264/2.7
(58) Field of Search ................... 264/1.1, 1.24, 264/1.28, 1.29, 2.6, 2.7; 65/385, 435, 475, 477

(56) References Cited

U.S. PATENT DOCUMENTS

| 5,928,574 A | 7/1999 | DiMarcello et al. |
| 6,010,741 A | 1/2000 | Rosenkranz et al. |

FOREIGN PATENT DOCUMENTS

| EP | 0 887 319 A1 | 12/1998 |
| JP | 580 09 836 A | 1/1983 |
| JP | 060 56 456 A | 3/1994 |
| JP | 090 77 527 A | 3/1997 |
| JP | 091 42 890 A | 6/1997 |
| JP | 100 67 531 A | 3/1998 |
| JP | 102 59 036 A | 9/1998 |

*Primary Examiner*—Mathieu D. Vargot
(74) *Attorney, Agent, or Firm*—Sughrue Mion, PLLC

(57) ABSTRACT

A method of cooling an optical fiber during drawing through contact with at least one cooling fluid in at least one cooling area, wherein fast cooling, i.e. cooling that is faster than cooling in the surrounding air, from an initial temperature of the fiber to a temperature at the end of fast cooling of said fiber, is followed by slow cooling, i.e. cooling slower than cooling in the surrounding air, from a temperature of said fiber at the start of slow cooling to a temperature of said fiber at the end of slow cooling.

5 Claims, 3 Drawing Sheets

METHOD OF COOLING AN OPTICAL FIBER WHILE IT IS BEING DRAWN

The present invention relates to a method of cooling an optical fiber during drawing through contact with at least one cooling fluid in at least one cooling area.

BACKGROUND OF THE INVENTION

There are various categories of optical fiber: optical fibers based on oxide glass, optical fibers based on fluoride glass, and plastics material optical fibers based on polymer materials. Optical fiber based on oxide glass, generally silica glass, is manufactured by drawing a heated preform, which is a large cylinder of silica glass, optionally at least partly doped, whose diameter generally lies in the range 20 mm to 200 mm and whose length generally lies in the range 300 mm to 2000 mm. FIG. 1 is a diagrammatic view of a drawing tower 1. A preform 2 is melted in a drawing furnace 3 which heats the preform to a temperature of approximately 2000° C. A fiber 7 obtained in this way is cooled initially by the surrounding air, then in at least one cooling device 4, and finally by the surrounding air again, before it is fed into a coating device 5. The position of the cooling device 4 in the drawing tower 1 is generally optimized to obtain the correct fiber temperature for resin coating. The coating device 5 forms the coating of the fiber 7 from at least one coating resin which is usually cured by ultraviolet light. The device 5 generally includes at least one injection device (5a, 5c) followed by at least one curing device (5b, 5d). In the situation shown in FIG. 1, the device 5 includes a primary resin injection device 5a followed by a device 5b for curing said resin by ultraviolet light, and then a secondary resin injection device 5c followed by a device 5d or curing said resin by ultraviolet light. Finally, a coated optical fiber 8 is pulled by a capstan 6 and then wound onto a take-up spool 9.

The devices under the drawing furnace 3, which are on a common downward vertical axis Z, are generally identified by their position relative to the bottom of the drawing furnace 3, as indicated by the dimension z. All the components of the device shown in FIG. 1 are well-known to the person skilled in the art. Others, which are not shown, are also well-known to the person skilled in the art. Thus, for example, means for measuring the diameter of the bare and/or coated fiber, means for measuring the eccentricity of the fiber within its primary and/or secondary coating, and means for measuring the temperature of the fiber at a given distance along the axis are part of the prior art.

Cooling must reduce the temperature of the fiber leaving the drawing furnace to a temperature compatible with application of the coating resin, i.e. a temperature of the order of 50° C. The temperature of the fiber leaving the drawing furnace is high, generally of the order of 1000° C. to 2000° C. for a silica-based fiber, depending on the drawing furnace and the drawing speed used. Cooling the fiber between leaving the drawing furnace and entering the coating device is one of the major problems to be solved in drawing fibers, especially if it is required to increase the drawing speed. It is known that the attenuation of the fiber depends on the cooling conditions, and moreover, if the temperature of the fiber on entering the coating device is too high, this can lead to problems both with the eccentricity of the fiber in its coating and with the quality of said coating. The speed at which silica-based fibers are drawn industrially, which was 300 meters per minute (m/min) a few years ago, has increased more and more, and is now of the order of 1500 m/min or more. This tendency is still apparent, associated with increasing productivity, which is one of the major objectives of the optical fiber industry.

The principle of the process for fabricating optical fibers based on fluoride glass is the same, but the preform is generally smaller, generally having a diameter of 15 mm to 20 mm and a maximum length of a few centimeters to a few tens of centimeters, for example 10 cm, and the temperature on leaving the drawing furnace generally lies in the range 300° C. to 450° C. The same technical problem can arise in this case. Similarly, the same technical problem can arise in the fabrication of optical fibers based on polymer materials, in which the preform is generally smaller, generally having a diameter of a few tens of millimeters, for example 80 mm, and a maximum length of a few tens of centimeters, for example 50 cm, and the temperature on leaving the drawing furnace generally lies in the range 200° C. to 250° C. The remainder of the description refers to optical fibers based on silica, but identical reasoning applies to other types of optical fiber, including optical fibers based on glasses other than silica.

Various devices have been used to cool silica-based fiber. One solution would be to increase the area of heat exchange between the fiber to be cooled and the surrounding air, in particular by increasing the distance between the drawing furnace and the coating device. However, this would entail increasing the height of the drawing towers currently used, which would be much too costly, especially in terms of the investment required.

Another solution is to improve the efficiency of cooling over the existing distance between the drawing furnace and the coating device. In addition to simple cooling by the surrounding air, which proves to be highly inadequate for the drawing towers currently used, the common principle of various devices used in the industry (as illustrated by European Patent Application EP-A1-0 079 186, for example) consists in injecting a gas radially towards the surface of the fiber at a given distance from the outlet of the drawing furnace and causing said gas to flow upwards or downwards over a particular length of the fiber, inside a heat exchange tube. As is well-known to the person skilled in the art, heat is transferred because of the thermal conductivity of said gas, which gas is generally air, carbon dioxide, nitrogen, argon, or helium, and is preferably helium possibly mixed with nitrogen. The periphery of the tube is preferably cooled by a cooling fluid, which is generally water. By way of example, U.S. Pat. No. 4,761,168 describes an improvement to such systems in which the gas is caused to flow along the fiber in a heat exchange tube of particular shape, which ensures regular renewal of the boundary layer of gas flowing along the fiber. The improvement is aimed at improving the efficiency of heat exchange.

One of the main problems encountered in subsequent use of optical fiber cooled in the above way is that the cooling imposed on the fiber during its fabrication, on leaving the drawing furnace and before passing through the coating device, significantly increases the level of Rayleigh back scattering associated with the fiber and therefore increases the major part of the attenuation of the optical fiber ready for use. It is known in the art that the attenuation of optical fiber at the wavelengths used, whether close to 1310 nm or to 1550 nm, must be as low as possible for optimum transmission of optical signals in said fiber.

That is why several solutions have been proposed to the problem of defining cooling profiles which are obtained by particular methods and/or devices and which minimize Rayleigh back scattering in the fiber. At least partial use of slow cooling profiles is generally proposed, meaning profiles that are slower than those obtained for cooling by the surrounding air. Patent Application DE-A1-3 713 029, for example, teaches slow cooling on leaving the drawing furnace.

Such methods are not satisfactory, however, in that they do not achieve sufficient reduction of the attenuation compared to the theoretical minimum attenuation, without degrading the mechanical strength of the fiber.

OBJECTS AND SUMMARY OF THE INVENTION

An object of the present invention is to alleviate the above drawbacks of prior art cooling systems by improving the cooling of an optical fiber during drawing. One particular object of the invention is to conserve or even to reduce Rayleigh back scattering significantly, compared to prior art cooling systems, and therefore to conserve or even to reduce the attenuation of the fiber fabricated by a drawing process using the cooling method of the invention, and to preserve the mechanical strength of the fiber.

To this end, the invention provides a method of cooling an optical fiber during drawing, through contact with at least one cooling fluid in at least one cooling area, wherein, in a fast cooling area, fast cooling, i.e. cooling that is faster than cooling in the surrounding air, from an initial temperature of the fiber lying in the range 2000° C. to 1500° C. for fibers based on silica glass, lying in the range 450° C. to 250° C. for fibers based on fluoride glass, and lying in the range 250° C. to 175° C. for fibers based on a polymer material, to a temperature at the end of fast cooling lying in the range 1700° C. to 1200° C. for fibers based on silica glass, lying in the range 400° C. to 200° C. for fibers based on fluoride glass, and lying in the range 225° C. to 75° C. for fibers based on a polymer material, is followed, in a slow cooling area, by slow cooling, i.e. cooling slower than cooling in the surrounding air, from a temperature of said fiber at the start of slow cooling lying in the range 1700° C. to 1000° C. for fibers based on silica glass, lying in the range 400° C. to 150° C. for fibers based on fluoride glass, and lying in the range 225° C. to 50° C. for fibers based on a polymer material, to a temperature of said fiber at the end of slow cooling lying in the range 1500° C. to 700° C. for fibers based on silica glass, lying in the range 350° C. to 25° C. for fibers based on fluoride glass, and lying in the range 200° C. to 25° C. for fibers based on a polymer material.

There can be a transition area in the surrounding air between the fast cooling area and the slow cooling area, although this is not essential.

The fast cooling of the fast cooling area is at least as fast, and preferably faster, than cooling in the surrounding air. In other words, the instantaneous slope dT/dt of fast cooling, where T is the temperature of the fiber and t is time, has a higher absolute value for such cooling than said instantaneous slope for cooling the fiber in the surrounding air. Said instantaneous slope has a higher absolute value for such cooling than said instantaneous slope for cooling the fiber in the surrounding air, preferably on average in the fast cooling area, more preferably in the major part of the fast cooling area, and even more preferably in virtually all of the fast cooling area.

The slow cooling of the slow cooling area is at least as slow, and preferably slower, than cooling in the surrounding air, at least locally, in the vicinity of the critical temperature. In other words, the instantaneous slope dT/dt of slow cooling, where T is the temperature of the fiber and t is time, has a lower absolute value for such cooling than said instantaneous slope for cooling the fiber in the surrounding air. Said instantaneous slope has a lower absolute value for such cooling than said instantaneous slope for cooling the fiber in the surrounding air, preferably on average in the slow cooling area, more preferably in the major part of the slow cooling area, and even more preferably in virtually all of the slow cooling area.

In a preferred implementation of the invention the temperature profile of each cooling area is established so that the fictive temperature of the cladding is maximized and the fictive temperature of the core is minimized.

An implementation of the above kind advantageously preserves the attenuation of the fiber during cooling whilst improving the mechanical strength of the fiber fabricated by drawing using the cooling method of the invention. The mechanical strength is defined by Bellcore standard CR 20, February 1998 edition, relating to the rupture of 50% of coated optical fibers subjected to longitudinal elongation, in a statistical distribution of fibers tested in this way, using Weibull's statistical law.

The terms "cladding" and "core" are familiar to the person skilled in the art. The core corresponds to the part where at least approximately 50% of the light energy propagates, i.e. to the central part of the optical fiber. The term "cladding" conventionally refers to the part which extends out to a diameter of 125 $\mu$m, i.e. the peripheral part of the optical fiber complementary to the core. What is of interest in the present context is the peripheral part of the cladding, which influences the mechanical properties and in particular the mechanical strength of the optical fiber. The expression "fictive cladding temperature" is used. In the case of an optical fiber made from a primary preform obtained by a modified chemical vapor deposition (MCVD) process, for example, surface-coated by deposition from a plasma, the relevant concept is the fictive surfacing temperature.

Fictive temperature is a concept recently introduced into the glass art with a view to better understanding the behavior of glass. The fictive temperature exploits the thermal history of a given silica compound, possibly one that has been doped, for a given property p. The concept can be applied to optical fibers, especially during drawing. At present it is measured indirectly on the material by Raman or infrared analysis. The present application refers to the fictive temperature associated with Rayleigh back scattering.

During drawing, the fictive temperature for said substance decreases continuously as a function of the imposed cooling profile, for a given substance, and assumes a constant value when the temperature of said silica is very much lower than its glass transition temperature.

The fictive temperature concept is the subject of much research. Reference is made here to the research carried out by G. W. Scherer, "Relaxation in Glass and Composites", Krieger Publishing, 1992, in conjunction with the work of C. T. Moynihan, "Phenomenology of the Structural Relaxation Process and the Glass Transition", Assignment of Glass Transition, ATM STP 1249, ed. American Society for testing and materials, 1994, pp. 32–49 and O. S. Narayanaswamy, Journal of the American Ceramics Society, 1971, 54(10), pp. 491–498. Programs based on the above research simulate fictive temperature calculations based on relaxation characteristics of glass with a given composition. Said simulations have been correlated with experimental results based on measuring the attenuation and mechanical strength of fiber heated and quenched under varying cooling conditions.

Because the core is the main light guiding part of the optical fiber, the attenuation of the optical fiber obtained by a drawing process during which the cooling method of the invention is employed is naturally related to the fictive temperature of the core of the fiber. Because of surface effects at the surface of the optical fiber, the mechanical strength of the optical fiber obtained by a drawing method during which the cooling method of the invention is employed is naturally related to the fictive temperature of the cladding of the fiber. The use of the method of the invention therefore results from a compromise between optimizing the fictive temperature of the core of the fiber and optimizing the fictive temperature of the cladding of the fiber.

The method of the invention therefore has the advantage of enabling practical control over two important parameters of optical fiber made by a drawing process during which said cooling device is employed, namely its attenuation and mechanical strength. It has been found that the fast cooling profile in accordance with the invention has virtually no influence on the attenuation of said optical fiber.

Another advantage of the method of the invention is that it is consistent with economic constraints which limit the height of the part of the tower available for cooling and which lead to the use of high drawing speeds. The fast cooling area represents an improvement in terms of the height of the drawing tower and/or the drawing speed, and enables the length of the slow cooling area to be increased, in other words fiber attenuation to be improved. It also has the advantage that the temperature of the fiber on entering the slow cooling area can be controlled, regardless of the drawing speed.

In one implementation, the profile of the slow cooling is chosen so that the fictive temperature of the core is minimized and the profile of the fast cooling is then adjusted so that the fictive temperature of the cladding is maximized. It is therefore possible to provide means for implementing the given slow cooling profile on the drawing tower on which the fiber is drawn, in order to minimize the fictive temperature of the core, and then to provide means for implementing the fast cooling profile on said drawing tower to maximize the fictive temperature of the cladding. An alternative approach, and one that is usually preferred, is to give priority to controlling attenuation, and to be content with the resulting maximum mechanical strength.

In another implementation, the slow cooling profile is chosen so that the fictive temperature of the cladding is maximized and the fast cooling profile is then adjusted so that the fictive temperature of the core is minimized. It is therefore possible to provide means for implementing the given fast cooling profile on the drawing tower on which the fiber is drawn, in order to maximize the fictive temperature of the cladding, and then to provide means for implementing the slow cooling profile on said drawing tower to minimize the fictive temperature of the core. An alternative approach that may be preferred is to give priority to mechanical strength and to be content with the resulting minimum attenuation.

The initial temperature of the fiber on entering the fast cooling area is generally approximately equal to the temperature of the fiber on leaving the drawing furnace. As previously explained, the temperature of the fiber on leaving the fast cooling area depends on the composition of the cladding and is established on the basis of the required fictive cladding temperature.

The initial temperature of the fiber on entering the slow cooling area and, as previously explained, the temperature of the fiber on leaving the slow cooling area generally both depend on the composition of the core and are established on the basis of the required fictive temperature of the core.

In one implementation, additional fast cooling is applied in a second fast cooling area after said slow cooling.

Additional fast cooling advantageously reduces the temperature of the fiber to the entry temperature of the coating area without degrading the mechanical and optical properties of the fiber.

The present invention, although described with reference to silica glass fibers, applies equally to the other categories of fiber described previously, the person skilled in the art adapting the temperature ranges accordingly.

The cooling fluid is chosen from the group comprising air, argon, nitrogen, carbon dioxide, and helium, for example. Said cooling fluid is preferably helium, possibly mixed with nitrogen.

The invention finally relates to apparatus for implementing the method of the invention including at least one given fast cooling device and one given slow cooling device.

BRIEF DESCRIPTION OF THE DRAWINGS

The invention will be better understood and its other features and advantages will become apparent on reading the following description, which is given by way of non-limiting example and with reference to FIGS. 1 to 5.

MORE DETAILED DESCRIPTION

Figure 1:
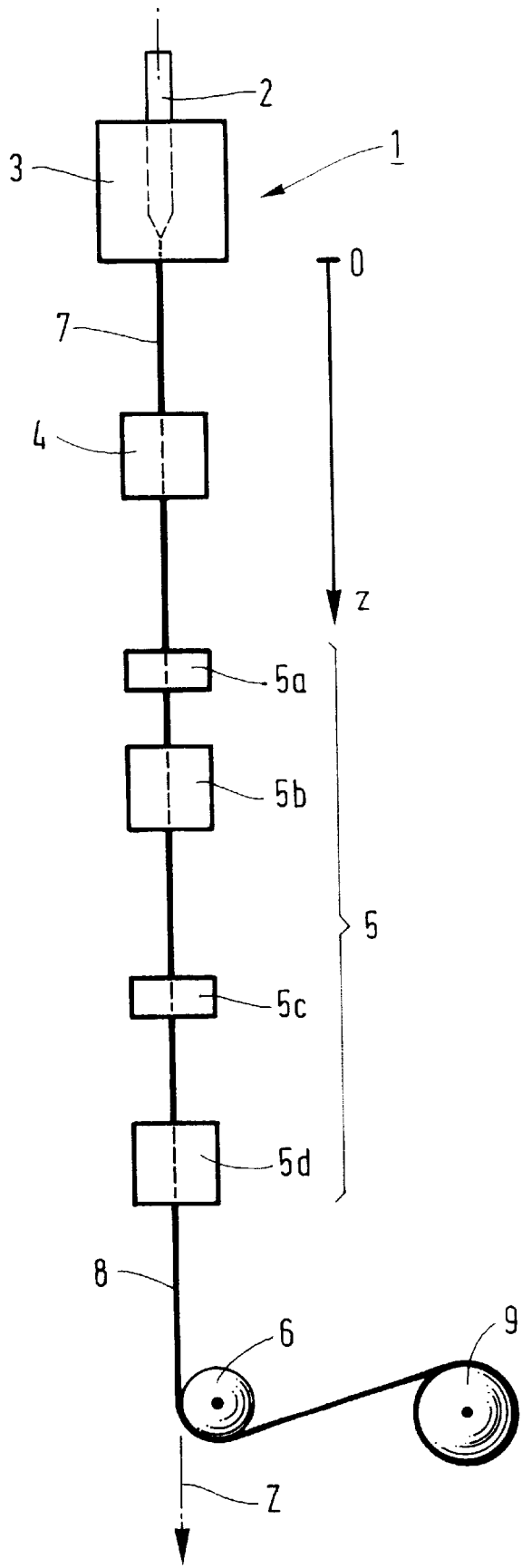
FIG. 1 is a diagrammatic view of a drawing device incorporating a prior art optical fiber cooling device.

FIG. 1 is described above in connection with the prior art. The drawing tower 1 includes a drawing furnace 3, a prior art cooling device 4, a coating device 5, a capstan 6, and a take-up spool 9.

Figure 2:
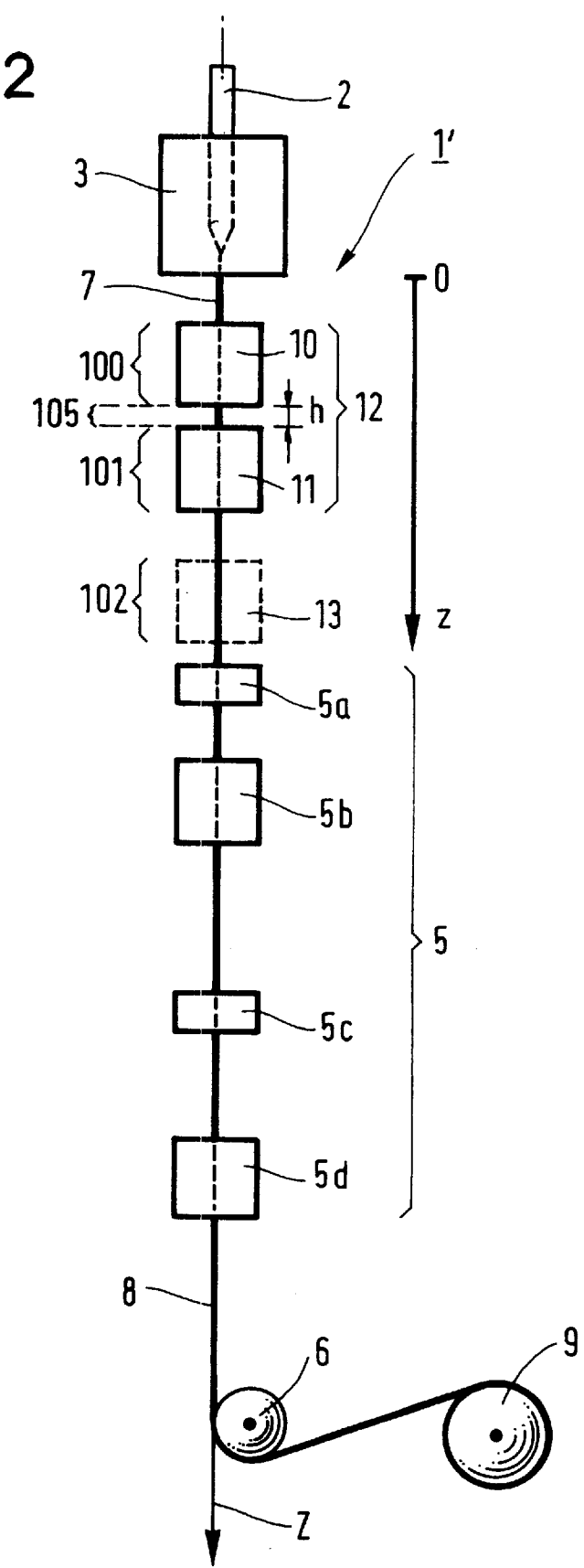
FIG. 2 is a diagrammatic view of a drawing device incorporating an optical fiber cooling device in accordance with the invention.

FIG. 2 shows a drawing tower 1' which has the same components as FIG. 1 but in which the cooling device 12 uses the method of the invention. Said cooling device 12 comprises a first, fast cooling device 10 which defines a fast cooling area 100 and a second, slow cooling device 11 which defines a slow cooling area 101. The two devices are placed one above the other, so delimiting a transition area 105 of height h. The height h can take any value.

In a variant, shown in dashed lines in FIG. 2, the cooling device in accordance with the invention further includes a fast cooling tube 13 which defines a fast cooling area 102. The tube 13 may not be necessary, for example because there is sufficient space for the fiber 7 to be cooled by the surrounding air between leaving the slow cooling device 11 and entering the coating device 5. Conversely, a fast cooling device such as the tube 13 can prove to be necessary if the fiber 7 is to reach the temperature for entering the coating device 5 within the available space. At this distance, the device 13 can have virtually no further influence on the mechanical and/or optical properties of the coated fiber 8 obtained from the fiber 7, the various constituents of the fiber 7 being sufficiently fixed on leaving the slow cooling device 11.

The following example illustrates one particular implementation of the invention without limiting the scope of the invention.

EXAMPLE

Figure 3:
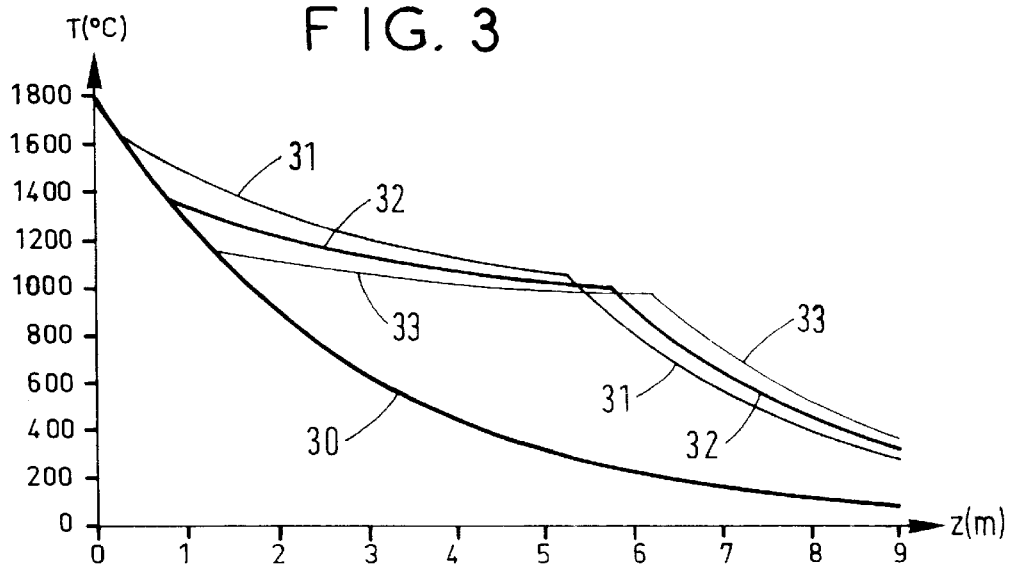
FIG. 3 shows a few cooling curves for a prior art drawing device.

FIG. 3 shows a few cooling curves for the optical fiber in a prior art drawing device which, compared to the device shown in FIG. 2, does not include the devices 10 and 13. The temperature at the outlet from the drawing furnace 3 is 1800° C., the total height between the drawing furnace 3 and the coating device 5 is 9 meters (m), and the drawing speed is 900 m/min. In the prior art arrangement shown there is only one slow cooling device 11 at the outlet from the drawing furnace 3. A heating device 11 which is 5 m long and has a given efficiency is provided. The distance z in meters from the bottom of the drawing furnace 3 (see FIG. 2) is plotted on the abscissa axis and the temperature T of the fiber in ° C. is plotted on the ordinate axis. The equation for the continuous parts of the cooling curves is of the following type:

$$T(° C.) - T_0 = (T_e - T_0) \cdot \exp(-\alpha * z),$$

where z is the distance in meters and $\alpha$, $T_e$ and $T_0$ are glass relaxation parameters. Respective curves 31, 32 and 33 are shown for temperatures $T_{11}$ on entering the heating device 11 equal to 1660° C., 1400° C. and 1170° C. A comparative curve 30 is shown for simple cooling in air, with no cooling device 10, 11 or 13 between the drawing furnace 3 and the coating device 5.

Figure 4:
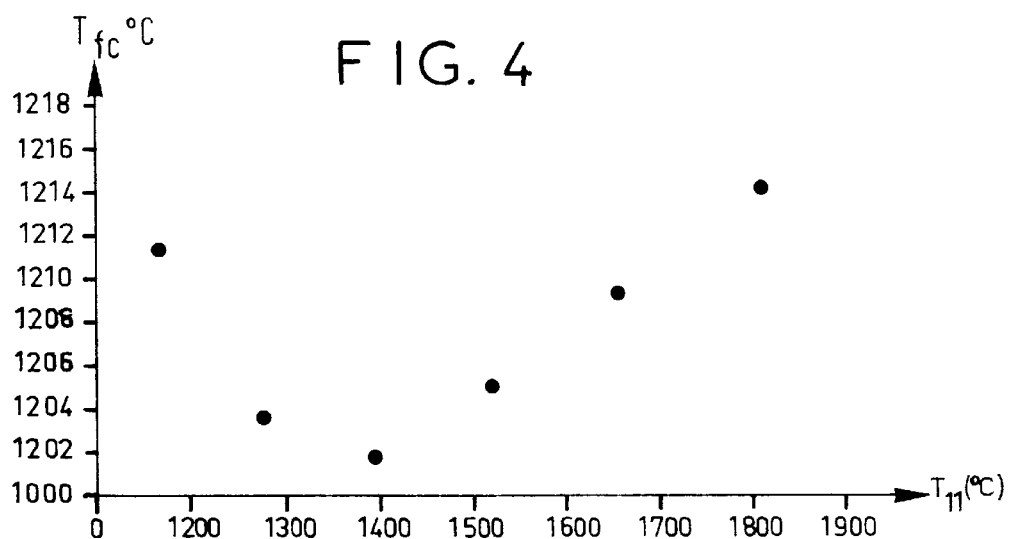
FIG. 4 shows the fictive temperature of the core of the fiber 7 in ° C. plotted on the ordinate axis as a function of the temperature in ° C. on entering the slow cooling device 11 plotted on the abscissa axis, in the drawing device shown in FIG. 2.

In conjunction with FIG. 3, FIG. 4 represents the fictive temperature $T_{fc}$ of the core of the fiber 7 in ° C. plotted on the ordinate axis as a function of the temperature $T_{11}$ in ° C. on entering the slow cooling device 11, for the same drawing device, that shown in FIG. 3. It can be seen that there is an optimum value of said entry temperature $T_{11}$ equal to approximately 1400° C. for which the fictive temperature $T_{fc}$ of the core of the fiber 7 is a minimum and equal to approximately 1202° C. The final position of the device 11 on the drawing tower 1' is therefore determined by that minimum entry temperature, for which the fictive temperature $T_{fg}$ of the cladding is approximately 1423° C.

A fast cooling device 10 of the invention, with a length of 20 cm and a given efficiency, is then installed on the drawing tower 1', between the drawing furnace 3 and the device 11, to produce a drawing device as shown in FIG. 2, without the device 13. Said device 10 is adjusted so that a maximum fictive temperature $T_{fg}$ of the cladding equal to 1440° C. is obtained and the slow cooling device entry temperature is maintained at $T_{11}$. The fictive temperature $T_{fc}$ of the core is then calculated and is again equal to approximately 1202° C.

For example, simple cooling in air, as shown by the curve 30 in FIG. 3, gives a fictive core temperature $T_{fc}$ equal to approximately 1259° C. and a cladding temperature $T_{fg}$ equal to approximately 1480° C.

Figure 5:
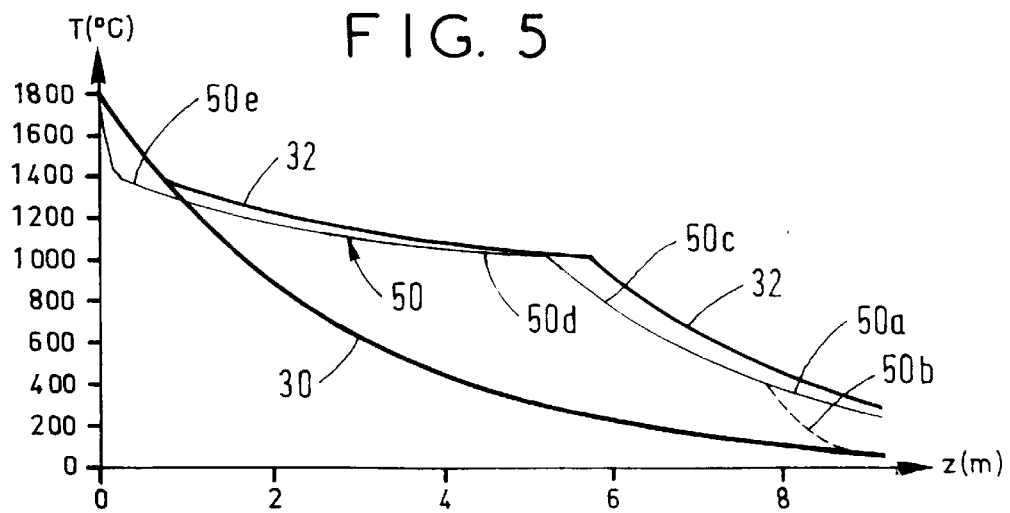
FIG. 5 shows the cooling curve finally imposed on the fiber by the method of the invention.

FIG. 5 shows the cooling curve 50 finally imposed on the fiber by the method of the invention. The curves 30 and 32 (cf. FIG. 3) are shown for comparison. The fast cooling profile 10 (curve 50e) is followed by the slow cooling profile 11 (curve 50d), which is followed by cooling in the surrounding air (curve 50c), which either continues as far as the coating device 5 (curve 50a) or is followed by a fast cooling profile 13 (curve 50b) as far as said device 5.

The coated optical fiber 8 leaving the drawing tower 1' and having undergone one stage of cooling comprising the fast cooling profile 10 followed by the slow cooling profile 11 in accordance with the invention therefore has improved properties, mainly in terms of mechanical strength, which is increased by 1 to 10% relative to a fiber manufactured as in the prior art, whilst retaining a level of attenuation 0.005 dB/km lower than achieved by cooling in air.

Of course, the method of the invention is not limited to the implementations described above. In particular, it is possible to place the cooling device 12 between the bottom on the drawing furnace 3 and the top of the coating device 5 and at any distance from the bottom of the drawing furnace 3, provided that the fictive temperature $T_{fc}$ of the core is minimized and the fictive temperature $T_{fg}$ of the cladding is maximized.

What is claimed is:

1. A method of cooling an optical fiber during drawing through contact with at least one cooling fluid in at least two cooling areas, said method comprising the steps of:

in a fast one of said cooling areas, fast cooling the optical fiber, faster than cooling in surrounding air, from an initial temperature of the fiber lying in the range 2000° C. to 1500° C. for fibers based on silica glass, lying in the range 450° C. to 250° C. for fibers based on fluoride glass, and lying in the range 250° C. to 175° C. for fibers based on a polymer material, to a temperature at the end of the fast cooling lying in the range 1700° C. to 1200° C. for fibers based on silica glass, lying in the range 400° C. to 200° C. for fibers based on fluoride glass, and lying in the range 225° C. to 75° C. for fibers based on a polymer material, and then, in a slow one of said cooling areas, slow cooling, slower than cooling in the surrounding air, from a temperature of said fiber at the start of slow cooling lying in the range 1700° C. to 1000° C. for fibers based on silica glass, lying in the range 400° C. to 150° C. for fibers based on fluoride glass, and lying in the range 225° C. to 50° C. for fibers based on a polymer material, to a temperature of said fiber at the end of the slow cooling lying in the range 1500° C. to 700° C. for fibers based on silica glass, lying in the range 350° C. to 25° C. for fibers based on fluoride glass, and lying in the range 200° C. to 25° C. for fibers based on a polymer material.

2. The method according to claim 1, wherein the temperature profile of each cooling area is established so that the fictive temperature of a cladding of the optical fiber is maximized, and the fictive temperature of a core of the optical fiber is minimized.

3. A method according to claim 2, wherein the slow cooling profile is chosen so that the fictive temperature of the core is minimized and the fast cooling profile is then adjusted so that the fictive temperature of the cladding is maximized.

4. A method according to claim 2, wherein the slow cooling profile is chosen so that the fictive temperature of the cladding is maximized and the fast cooling profile is then adjusted so that the fictive temperature of the core is minimized.

5. A method according to claim 1, wherein additional fast cooling is applied in a second fast cooling area after said slow cooling.

* * * * *